(12) United States Patent
Kaplan et al.

(10) Patent No.: US 8,285,153 B2
(45) Date of Patent: Oct. 9, 2012

(54) SINGLE CHIP TWO-POLARIZATION QUADRATURE SYNTHESIZER, ANALYSER AND OPTICAL COMMUNICATIONS SYSTEM USING THE SAME

(75) Inventors: Arkady Kaplan, Rockville, MD (US); Isaac Shpantzer, Bethesda, MD (US)

(73) Assignee: CeLight, Inc., Silver Spring, MD (US)

( * ) Notice: Subject to any disclaimer, the term of this patent is extended or adjusted under 35 U.S.C. 154(b) by 633 days.

(21) Appl. No.: 12/413,161

(22) Filed: Mar. 27, 2009

(65) Prior Publication Data

US 2009/0185810 A1   Jul. 23, 2009

Related U.S. Application Data

(63) Continuation-in-part of application No. 11/695,920, filed on Apr. 3, 2007, now Pat. No. 7,715,720, and a continuation-in-part of application No. 11/679,376, filed on Feb. 27, 2007, now Pat. No. 8,050,351, and a continuation-in-part of application No. 12/045,765, filed on Mar. 11, 2008.

(51) Int. Cl.
*G02B 6/26* (2006.01)

(52) U.S. Cl. ........ 398/204; 398/203; 398/205; 398/206; 398/207

(58) Field of Classification Search ........... 398/203–207
See application file for complete search history.

(56) References Cited

U.S. PATENT DOCUMENTS

| 5,739,933 | A  | * | 4/1998 | Dembeck et al. | ............... | 398/45 |
| 5,793,512 | A  | * | 8/1998 | Ryu | ................................. | 398/97 |
| 2003/0007216 | A1 | * | 1/2003 | Chraplyvy et al. | ........... | 359/161 |
| 2005/0196176 | A1 | * | 9/2005 | Sun et al. | ...................... | 398/152 |
| 2008/0181618 | A1 | * | 7/2008 | Tian et al. | ..................... | 398/188 |

\* cited by examiner

*Primary Examiner* — Danny Leung
(74) *Attorney, Agent, or Firm* — Nadya Reingand

(57) ABSTRACT

An optical beam synthesizer formed on a single chip is provided. It allows M-PSK modulation for both beam polarizations. The synthesizer comprises an optical pulse shaper and two M-PSK modulators for each polarization. A single-chip-integrated analyzer is provided to receive a modulated data. Analyzer comprises a pulse shaper operating as an optical sampler and a pair of 90-degrees optical hybrids for each polarization. Each optical hybrids mix incoming portions of the modulated beams with portions of the local oscillator beams. Both the synthesizer and the analyzer include a set of mirrors located on the back and front surfaces of the chips to create compact designs. The output beams from the analyzer are detected by a set of balanced photodiodes, and the data is recovered. It is another object of the invention to provide a communication system for data transmission having the synthesizer and the analyzer.

18 Claims, 5 Drawing Sheets

SINGLE CHIP TWO-POLARIZATION QUADRATURE SYNTHESIZER, ANALYSER AND OPTICAL COMMUNICATIONS SYSTEM USING THE SAME

CROSS-REFERENCE TO RELATED APPLICATION

The present invention is a continuation-in-part of U.S. Ser. No. 11/679,376, filed Feb. 27, 2007, now U.S. Pat. No. 8,050,351 U.S. Ser. No. 11/695,920 filed Apr. 3, 2007, now U.S. Pat. No. 7,715,720 and 12/045,765 filed Mar. 11, 2008, all of which is fully incorporated herein by reference.

FIELD OF INVENTION

This invention relates generally to optical communications especially coherent communication with quaternary phase shift keying (QPSK) modulation format. The present invention discloses a single-ship integrated quadrature modulator (Synthesizer) and a receiver (Analyzer). These modules are of particular interest in the systems with orthogonal frequency division multiplexed (OFDM) transmission of data. These devices also can be used in communication with key-based multi-dimensional real-time hopping in frequency, polarization state, coherent modulation scheme (e.g. M-PSK, M-QAM) and symbol rate.

BACKGROUND OF THE INVENTION

The effective extension of the communication distance and the data capacity in next-generation optical signal technology is no longer a theoretical possibility hence becoming the feasible solutions for the modem optical network. This is due, mainly, to the combination of several critical technological advancements, such as, 1) coherent optical detection development, 2) multi-level (differential) phase-shift-keying (DPSK) modulation format adoption, 3) progress in adaptive electrical equalization technology.

FIG. 1 shows a schematic of a quadrature modulator 1. The principle of its operation is as follows. Input optical beam 2 is splitted into two arms of the MZ interferometer. Two Mach-Zehnder modulators (4 and 5) are placed in parallel; each MZM being located in each arm of the MZ interferometer. The biases of the MZMs are controlled by Bias 1 and Bias 2 (6 and 7) and driven by RF1 and RF2 data signals (8 and 9). The Phase port 10 of the QM controls relative phase shift between the arms of the MZ interferometer. An output beam 11 can be transmitted via an optical link.

On the receiving side a coherent detection is implemented to decode the received optical beam. In contrast to existing optical direct-detection system technology, an optical coherent detection scheme would detect an optical signal's amplitude as well as its phase and polarization. Within the fixed optical bandwidth more data can be transmitted using a coherent detection scheme with increased detection capability and spectral efficiency. Coherent detection provides increased receiver sensitivity by 2-6 dB compared to an incoherent system. In addition, since coherent detection enables an optical signal's phase and polarization to be measured and processed, the transmission impairments that previously presented challenges to accurate data reception can, in principle, be mitigated electronically when an optical signal is converted into the electronic domain. Tier-1 network providers have now realized the potential for optical coherent systems by deploying DPSK systems with improved DSP receiving circuits based on complicated optical phase-lock loops.

The optical hybrid (FIG. 2) is the critical part of the coherent receiver 20 needed to combine a local oscillator wave, Lo, with the received signal, S. Such an optical hybrid 21 is a key component in phase- or polarization-diversity schemes. Ideally, the hybrid should combine waves with quadrature relative phases at the outputs, providing the advantage of baseband processing. In a two-phase case outputs must be mutually phased at 90° (in-phase and quadrature, referred to as I and Q signals). In FIG. 2 couplers 22-25 are used for the waveguides combining and splitting, the phase shifter 26 introduces 90-degrees phase shift between I and Q components.

If the single phase shifter (or alternatively) two phase shifters provide a 90-degrees phase shift, then all four output beams received by a set of balanced photodetectors have 90-degrees relative phase difference of the form:

$$\{A=S+L_o, B=S-L_o, C=S+jL_o, D=S-jL_o\}.$$

The signals from the detectors 27 and 28 are processed in a digital signal processing unit and may be further displayed or used for continuing processing.

The coherent receiver may operate in homodyne or self-homodyne regime. In the self-homodyne implementation, the inputs are the received signal S and a delayed replica of it delayed by one symbol. In homodyne implementation, the incoming beam is mixed with a local oscillator beam from a local oscillator (not shown in the figure).

The goal of this invention is to use coherent transmitters/receivers, and channel compensation algorithms to achieve agile free-space optical communications links. The flexible architecture will provide secure, robust, multi-rate/multi-format optical transmission that is resistant to jamming and eavesdropping and achieves spectrally-efficient high data rate throughput in any challenging communication environment.

SUMMARY OF THE INVENTION

An integrated optical synthesizer is disclosed to be used for generation of optical multi-level PSK signal in coherent optical communications. This generated signal consists of two polarization components, each convey a respective multi-level PSK-modulated data. The synthesizer comprises an optical pulse shaper, which switches the synthesizer output on and off, and "off" regime corresponds to a data drive signals transitions.

In order to achieve compactness, necessary for integration, the synthesizer include at least four mirrors, two mirrors located on the front surface of the chip and two on the back surface.

The synthesizer operates in the following manner. A light beam enters the optical shaper, the output beam from the shaper is split into a first and second beams. The first beam is reflected from a first and a second mirror prior to entering a first M-PSK modulator, and the second beam is reflected from a third and a fourth mirror prior to entering a second M-PSK modulator. The first and the third mirrors located on the back output surface of the planar chip, and the second and the fourth mirrors are located on the front surface of the planar chip. The synthesizer also includes first and second polarization controllers after both M-PSK modulators; they output beams with polarization state orthogonal to each other.

Each M-PSK modulator includes a first and a second Mach-Zehnder modulator and an adjustable 90-degree phase difference between outputs from first and second Mach-Zehnder modulators. All four MZ modulators (Two for the first M-PSK modulator and two for the second M-PSK modulator) are coplanar each other and may be driven by independent RF signals.

It is another object of the present invention to provide an analyzer to receive the M-PSK modulated optical beam having two polarization states. The analyzer has an optical pulse shaper receiving an incoming local oscillator beam and outputting an initial shaped beam, which is by a splitter into first and second shaped beams. The optical pulse shaper that serves as an optical sampler. The first shaped beam is mixed with a first portion of the received modulated optical beam in a first 90° Optical Hybrid, both the first shaped beam and the first portion of the received modulated beam having a first polarization state. The second shaped beam is mixed with a second portion of the received modulated beam in a second 90° Optical Hybrid, both the second shaped beam and the second portion of the transmitted optical beam having a second polarization state being orthogonal to the first polarization state. The output beams from both 90° Optical Hybrids are detected by a set of balanced detectors, outputting a series of electrical signals being used to recover transmitted data. The pulse shaper, the first and the second 90° Optical Hybrid are formed as a part of a single planar chip.

In order to achieve compactness, necessary for integration, the analyzer includes at least four mirrors, two mirrors located on the front surface of the chip and two on the back surface. The first and the second shaped beams are reflected from these mirrors prior to entering the optical hybrids.

The chip for the synthesizer and analyzer are made of a material selected from ferroelectric or semiconductor material. The technology that is used with the electro-optical material is selected from indifussed metal technology, protonic-exchange optical technology, etching optical technology or milling optical technology.

It is another object of the present invention to provide a system and method for data transmission using the synthesizer and analyzer of the present invention. Such configuration allows improving communication performance for M-PSK data transmission in two polarization states.

DETAILED DESCRIPTION OF THE PREFERRED EMBODIMENT

The present invention now will be described more fully hereinafter with reference to the accompanying drawings, in which the preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 3:
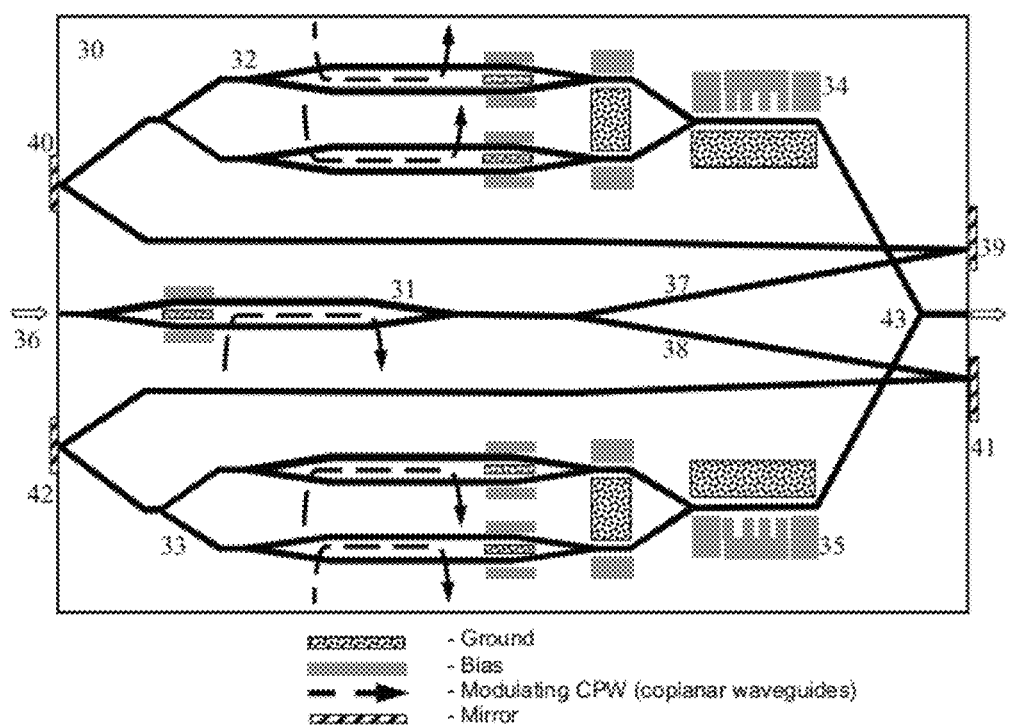
FIG. 3 shows a layout of the integrated quadrature modulator operating in two polarization states of light.

FIG. 3 shows a schematic of a Synthesizer 30, which includes an integrated pulse shaper 31, two QPSK modulators 32 and 33 and two polarization controller/scramblers 34 and 35. The principle of its operation is as follows. Input optical beam 36 is modulated by a pulse shaper 31 and split into two parts 37 and 38. Each part 37 and 38 of the signal experiences two successive reflections 39, 40 and 41, 42 at the chip edges and inputted into two Mach-Zehnder modulators 32 and 33 that are placed in parallel. Further, the output signals from two Mach-Zehnder modulators undergo polarization transformation by polarization controllers/scramblers 34 and 35 and combined together at the chip output (Y-branch polarization combiner 43). The biases of the each MZM within the chip are controlled by bias electrodes.

Each of the two QPSK modulators 32 and 33 (FIG. 3) is based on two broadband MZ modulators (independently controlled and biased) and one phase-shifter to maintain 90° between encoded in-phase (I) and quadrature-phase (Q) signals. Each branch is phase and/or amplitude modulated using a MZ modulator. The I and Q signals are then recombined into a single waveguide, which is disclosed in more details in U.S. patent application Ser. No. 11/679,376 by the same team of inventors.

A generalized single chip integrated Optical Modulator component 30 exhibits the following key innovations: (i) Multi-level synthesis of complex arbitrary discrete coherent quadrature constellations (M-PSK, M-QAM . . . ) using two D/A converters driving the two MZ constructs each associated with the I and Q axis in the constellation plane; (ii) Integrated orthogonal dual polarization for enhanced spectral efficiency and time-delayed data replication over orthogonal polarizations to mitigate fading and scintillation caused by air turbulence and (iii) Polarization scrambler that combines the optical signal polarization state on any arbitrary point on the Poincare Sphere.

The synthesizer is capable of modulating an arbitrary PSK or QAM signal onto each polarization (e.g., 2-, 4-, 8-, 16-PSK or 4-, 8-, 16-QAM). For example, assuming a symbol rate of 12.5 GHz in each polarization, a 16-QAM signal will encode 4 bit/symbol, for a bit rate of 50 Gbit/s/polarization. The total bit rate is 100 Gbit/s.

The synthesizer includes an integrated RZ pulse shaper. By gating the synthesizer output off while the multilevel modulator drive signals make transitions from one level to another, this pulse shaping dramatically improves transmitted waveform quality. Furthermore, it relaxes bandwidth requirements on the data modulators and the transmit D/A converters.

Another element of proposed integrated transmitter is a polarization converter/rotator device (PC) (34 and 35 in FIG. 3). This component is capable of performing a polarization state transformation by applied electrical control. The PC will combine the two QPSK modulator outputs into a single waveguide with orthogonal polarization states. In a single LN substrate, electro-optically adjusted birefringence is not sufficient to achieve effective polarization transformation since mode-conversion between the orthogonal TE and TM components is also required. Efficient 100% electro-optical conversion can be achieved by utilizing an off-diagonal element of the electro-optical tensor to cause mixing between the orthogonal TE and TM modes (normally uncoupled). However, an electro-optical TE↔TM converter alone is also not capable of providing general polarization transformation. In general, our approach is based on the known variable efficiency polarization conversion scheme, where the two different electrical fields are applied alternately along the interaction region.

In the preferred embodiment of a polarization converter/rotator, electrical field applied parallel to the LN crystal X direction to induce an off-diagonal element in the dielectric permittivity tensor via the strong electro-optic coefficient $r_{51}=28\times1012$ m/V. In this approach, a large number of short sections of birefringence tuning electrodes are periodically interleaved between short sections of TE↔TM mode converter electrodes. Although this arrangement may result in longer interaction lengths it clearly permits independent control of TE↔TM mode conversion and birefringence tuning. In such an orientation the TE and TM modes have significantly different propagation constants due to the large birefringence of LN. The propagation constant of the TM mode is mainly determined by the ordinary refractive index of LN, whereas the propagation constant of the TE mode is mainly determined by the extraordinary index.

Figure 4:
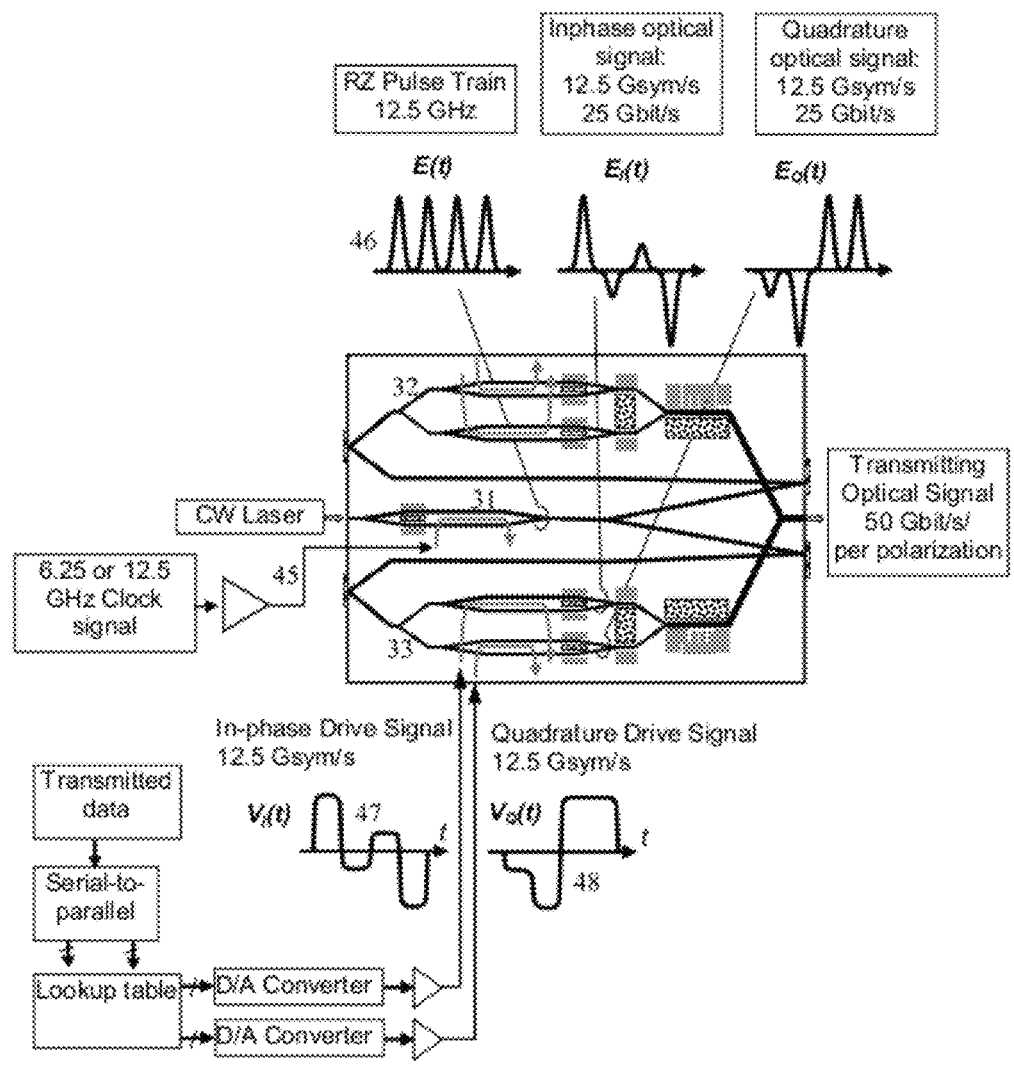
FIG. 4 shows an example of dual-polarization quadrature synthesizer for generalized QAM signals generation, demonstrating a 16-QAM encoding 4 bit/symbol/polarization. For simplicity, waveforms in only one polarization are shown. The symbol rate is 12.5 Gsym/s, and the bit rate is 50 Gbit/s/polarization, for a total bit rate of 100 Gbit/s.

In a preferred embodiment shown in FIG. 4, a Mach-Zehnder modulator 31 (pulse shaper) is driven by a sinusoidal clock signal 45 to generate a periodic return-to-zero (RZ) pulse train 46 at the symbol rate Rs=12.5 GHz. A various pulse shapes can be obtained, depending on the frequency and amplitude of the drive waveform, as well as the pulse-shaper modulator bias point. For example, driving the modulator by a clock at the symbol rate Rs=12.5 GHz one obtains 50% duty ratio pulses, while driving it by a clock at half the symbol rate, Rs/2=6.25 GHz, one can obtain pulse duty ratios of 33% or 67%. FIG. 4 illustrates how a pair of modulators 32 and 33 is driven to modulate 16-QAM, encoding 4 bit/symbol/polarization. A 50 Gbit/s data stream is parallelized, and a lookup table and pair of digital-to-analog converters generate the I and Q drive signals 47 and 48, each a four-level waveform at 12.5 Gsym/s. Such synthesizer architecture is extremely agile. By reprogramming the lookup table, it can generate a variety of constellations (2-, 4-, 8-, 16-PSK or 4-, 8-, 16-QAM). The 2- and 4-ary constellations can be obtained using two-level drive waveforms, which drive each data modulator into saturation. Generation of 8- and 16-ary constellations, however, requires drive waveforms with four to eight levels. In these cases, particular care must be exercised in drive waveform generation, modulator electrode design and impedance matching, because any distortion of the drive waveform can cause degradation of signal levels at which the modulator is not driven into saturation.

Employing the integrated pulse shaper makes the synthesizer architecture much more flexible, providing several key advantages. Thus, by gating the synthesizer output off while the multilevel modulator drive signals make transitions from one level to another, this pulse shaping dramatically improves transmitted waveform quality. In addition, it relaxes rise/fall time requirements on the data modulator and the modulator driver amplifiers. Furthermore, the use of a pulsed transmitter potentially improves jamming tolerance and reduces probability of interception and detection.

In preferred embodiment, single chip generalized modulator is fabricated on a 4" LiNbO3 (LN) wafer by titanium in-diffused technology, with waveguides designed for single-mode TEM operation on an X-cut or Z-cut LN crystals.

Moreover, in preferred embodiment the single chip generalized modulator is driven by a MEMs-based narrow linewidth contiguously tunable laser capable of fast hopping.

Furthermore, in preferred embodiment, the single chip generalized modulator is an interferometric device that is adaptively stabilized and recalibrated for each frequency hop of the laser using DSP algorithms to mitigate: (i) I, Q orthogonal mismatch; (ii) I, Q power balancing and (iii) Polarization orthogonality mismatch.

Furthermore, in preferred embodiment, the phase noise caused by vibration can be compensated by adaptive DSP algorithms that control the constellation accordingly.

A thermo-optical effect can be used to control the phase of the optical beams. The thermo-optical controllers of the couplers and/or phase-shifters can be used to complement or replace the electro-optical controllers.

Proposed Synthesizer based the single chip generalized modulator provides an innovative move over the current dedicated 2-bit QPSK modulators that lack these capabilities. Prior art does not disclose an integrated single chip modulator that produces an output beam in two polarization state of the light, where each state of polarization is multi-level PSK modulated. Such beam carries twice more information compared with the standard approach. There is a need to create modulators that help to improve an optical link capacity with advanced reliability and compactness.

A light beam, modulated with data using the synthesizer is transmitted toward a receiver. It can be transmitted via fiber or in a free-space link or in inter-satellite communication.

Figure 5:
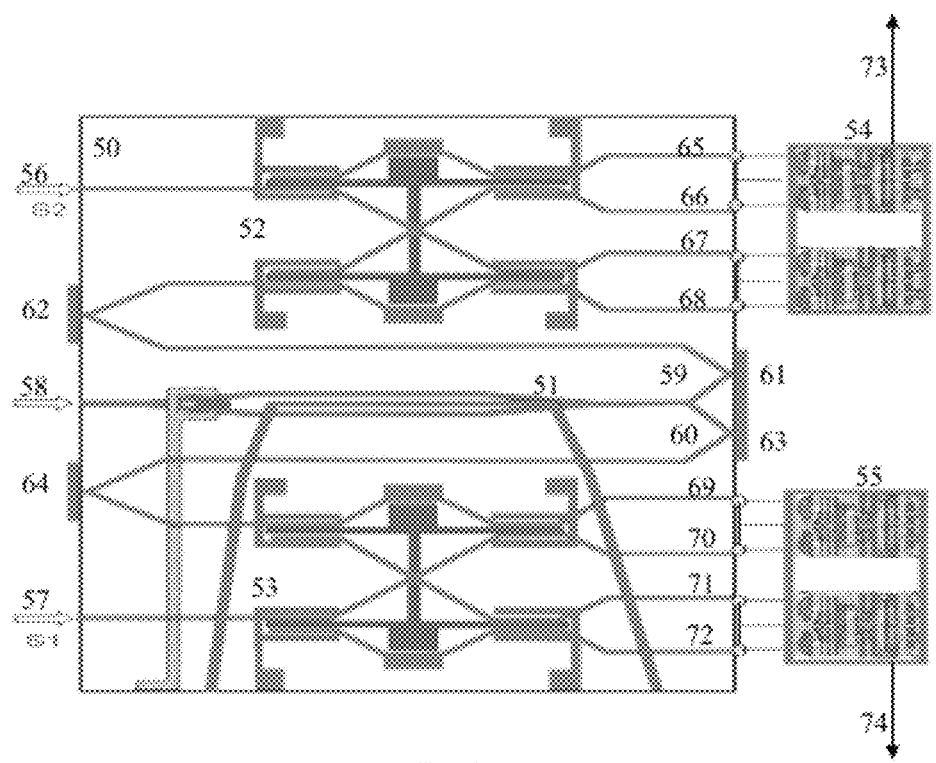
FIG. 5 shows a coherent optical receiver based on 90-degrees optical hybrid.

An Analyzer 50 shown in FIG. 5 is the most important component of the receiver. Similar to synthesizer, the analyzer also contains an integrated Mach Zehnder modulator 51 that serving as optical pulse shaper. Such single-chip receiver also includes two Optical Hybrids 52 and 53 coupled to two sets balanced photodiodes/TIA/A/D arrays 54 and 55, enabling a dual-polarization operation. Each optical hybrid with a set of photodetectors is similar to the receiver 20 of FIG. 2, it is described in more details by the same team of inventors in the U.S. patent application Ser. No. 11/695,920 filed Apr. 3, 2007, and parent patents for that application, they are fully incorporated herein by reference.

The optical sampling technique is a method to perform time-resolved measurements of optical data signals at high bit rates with a bandwidth that cannot be reached by conventional photodetectors and oscilloscopes. Proposed a dual-polarization linear sampling, which based on a proposed dual-polarization quadrature analyzer, appropriately combines the dual-polarization electric fields with the locally shaped fields, optimizes the relative phase between the two pairs of quadratures of their interferometric components. Such sampler/analyzer has a high practicality compared to single polarization and/or free-space setups. Due to the linearity of the diagnostic, the bandwidth is only limited by the bandwidth of the sampling pulse for both polarizations. Moreover, high sensitivity can be obtained and data waveforms can be reproduced without distortion by optimization of the sampling pulse.

An Optical LO is split to represent the horizontal and vertical polarizations and further optically pulse shaped/timed via the DSP. The two 90° Optical Hybrids performs the interferometric mixing filtering and optical sampling of the optical signal to obtain their real and conjugate field products for both polarizations. By simultaneously recording two orthogonal quadratures of the interference between the data stream and a sampling pulse with two balanced detectors, the phase sensitivity inherent to linear optics can be cancelled. As the device is based on linear optics and square-law low-speed photodetectors, its sensitivity is three orders of magnitude better than nonlinear optical sampling techniques, making it attractive for optical signal characterization and monitoring.

Figure 1:
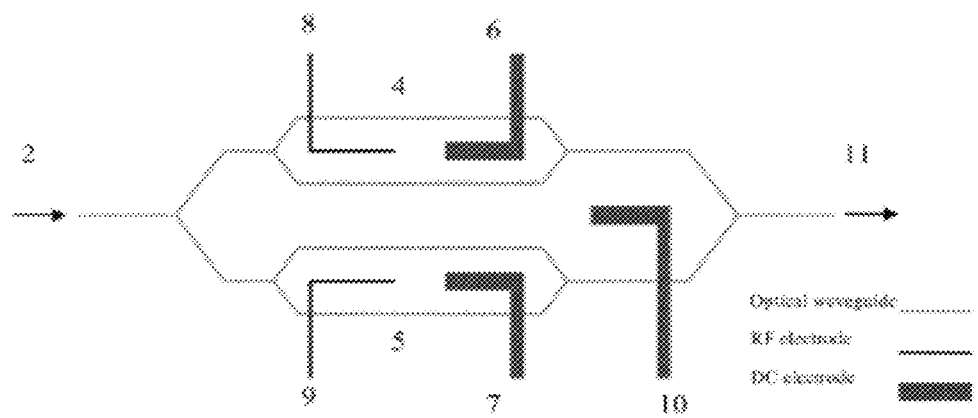
FIG. 1 shows a schematic of a quadrature modulator with two parallel MZMs nested in a MZ interferometer with a phase bias (Prior Art).
Figure 2:
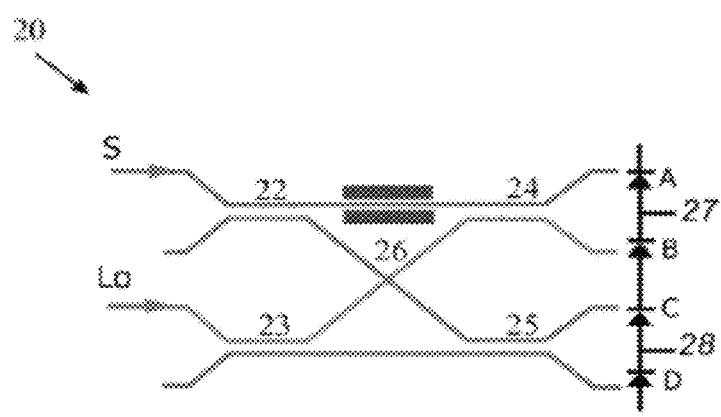
FIG. 2 shows a schematic of a coherent optical receiver based on 90-degrees optical hybrid (Prior Art).

The receiver of FIG. 2 is a key optical component of the Analyzer. It enables a linear transformation of the optical electric field to the electrical baseband.

The principle of Analyzer operation is as follows. Portions of the receiving optical beam 56 and 57 with polarization state orthogonal to each other enter the analyzer. A local oscillator beam 58 is modulated by a pulse shaper 51 and split into two parts 59 and 60. Each part of the signal experiences two successive reflections 61, 62 and 63, 64 at the chip edges and inputted into two 90° Optical Hybrids 52 and 53 that are placed in parallel (in the preferred embodiment). Further, the eight output signals 65-72 from each of two 90-degree Optical Hybrids are detected by eight photo-detectors that generate eight photocurrents, which then converted into digital outputs 73 and 74 serving for the data recovery. The coupling ratio and phase shifters each 90-degree Optical Hybrids within the chip are controlled by bias electrodes.

In optical coherent detection each of two 90-optical hybrid mixes the incoming signal with the four quadratural states associated with the reference signals Lo1 and Lo2 (59 and 60 respectively) in the complex-field space. Each optical hybrid then delivers the four light signals to two pairs of balanced detectors. Such four branch devices have been used for microwave and millimeter-wave detection systems since the mid-1990s and are key components for coherent receivers. In principle, 90° Optical Hybrid consists of linear dividers and combiners interconnected in such a way that four different vectorial additions of a reference signal, Lo, and signal, S, are obtained. The levels of the four output signals are detected by four photo-detectors that generate four photocurrents. By applying suitable base-band signal processing algorithms, the amplitude and phase of the unknown signal can be determined. The optical hybrid delivers the four light signals to two pairs of balanced detectors. Assuming that S(t) and Lo denote the two inputs to the optical hybrid, the four-branch output should have a form:

$$E_k(t) = \sqrt{\alpha/4}\left[S + Lo\exp\left(j\frac{\pi}{2}k\right)\right], \quad (1)$$

where k=0, 1, 2 and 3, represent the four hybrid outputs. Using the PSK modulation and phase-diversity homodyne receiver as an illustration, one can write the following expression for the signal power to be received by the (four) detectors:

$$P_k(t) \propto P_S + P_{Lo} + 2\sqrt{P_S P_{Lo}}\cos\left(\varphi_S(t) + \varphi_C(t) - \frac{\pi}{2}k\right), \quad (2)$$
$$k = 0, \ldots 3,$$

where $P_S$ and $P_{Lo}$ are the signal and reference power, respectively, $\phi_S(t)$ the signal phase modulation, and $\phi_C(t)$ the carrier phase relative to the $L_o$ phase. Using the back-to-back connection of the corresponded photodiodes (the balanced configuration) the following values can be readily generated:

$$i_{12} \equiv i_1 - i_2 = 2R\sqrt{P_S P_{Lo}}\cos(\phi_S(t) + \phi_C(t))$$

$$i_{34} \equiv i_3 - i_4 = 2R\sqrt{P_S P_{Lo}}\sin(\phi_S(t) + \phi_C(t)), \quad (3)$$

where R is the detector responsivity; indices 1-3, and 2-4 refer to the hybrid output branches. These two photocurrents encompassing the amplitude and phase information of the optical signal are fed to the TIAs. For the phase diversity receiver, as an example, the differential detection process within the balanced detectors can be accomplished by further squaring and adding the photocurrents with the result that is independent of the phase noise, compared to hybrids with N<4. Accordingly, the average electrical signal power is amplified by a factor of $P_{Lo}/P_S$. Following this linear transformation the signals are electronically filtered, amplified, digitized and processed. For optical coherent detection, a six-port 90° optical hybrid should mix the incoming signal with the four quadrature-states associated with the reference signal in complex-field space. For the device shown in FIG. 6(a), the four required output fields can be represented as:

$$[A;B;C;D]=[S+Lo;\tilde{S}Lo;S+jLo;\tilde{S}jLo], \quad (9)$$

The dual-polarization Optical Hybrid includes two 90°-optical hybrid and has three optical inputs, see FIG. 5: (i) An Optical Local Oscillator (Lo); and (ii) two optical inputs that represent horizontal and vertical polarizations. The hybrid performs the interferometric mixing of the optical Lo and the optical signal to obtain their real and conjugate field products.

In the Analyzer, a Mach Zehnder modulator pulses the local oscillator laser output, see FIG. 6(b) for single polarization. Within the receiver digital signal processor, a symbol synchronization algorithm insures that the local oscillator pulses are synchronized to the received optical signal. Thus, the balanced photodetectors serve as integrated coherent optical samplers and downconverters.

Figure 6:
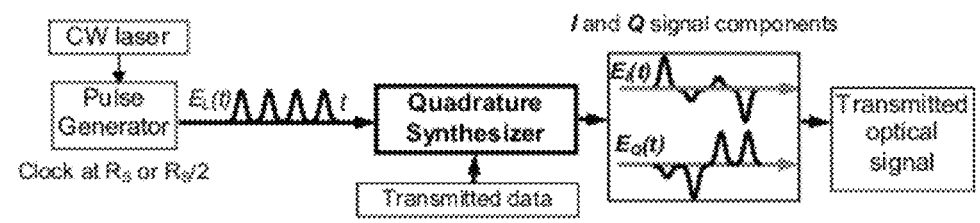
FIG. 6 shows schematic example of system architecture using (a) quadrature synthesizer with integrated pulse shaper, (b) coherent optical sampling receiver with integrated pulse shaper. A 16-QAM signal is illustrated as an example (for simplicity, only one polarization is shown); (c) a block diagram of the communication system, which implements the synthesizer and analyzer of the present invention.
Figure 6:
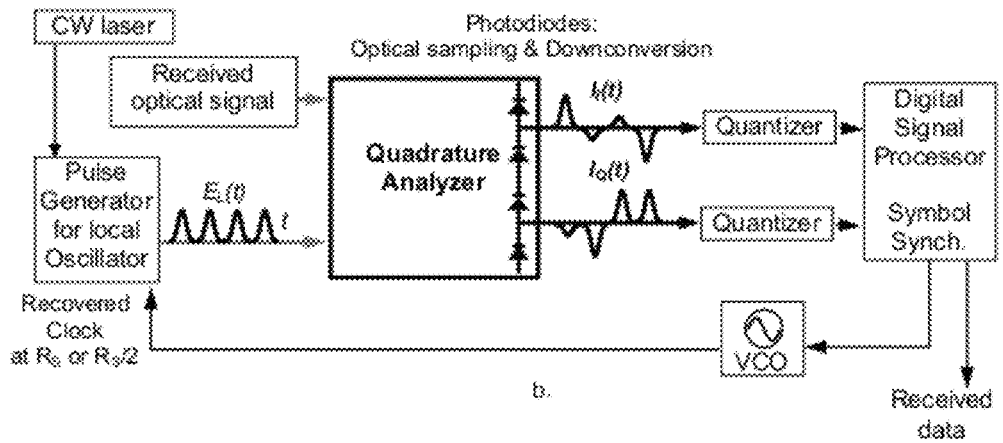
Figure 6:
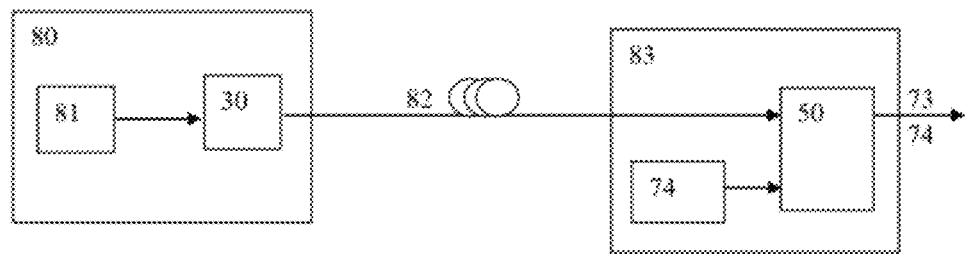

The analyzer architecture has several key advantages. First, a single pulsed optical local oscillator samples both the inphase and quadrature photocurrents in each of the two polarizations (although only one polarization is shown in FIG. 6). Since the pulsed local oscillator can be distributed without jitter in the stabilized receiver hybrid, this approach essentially eliminates the jitter that would be associated with an electrical sample and hold. The sampled I and Q electrical signals can be fed to quantizers that have substantially relaxed specifications on aperture jitter. Second, the use of identical pulse shapes at the transmitter and receiver represents optical matched filtering, which optimizes receiver performance in the presence of noise.

In the preferred configuration, the key optical component of the packaged Analyzer include: (i) Dual Polarization highly integrated Optical Hybrids fabricated in LN titanium diffused waveguide; and (ii) An innovative array of four balanced photodiodes and TIA integrated using InP technology.

In the preferred configuration, the InP array performs the conversion to the electrical band to derive I, Q signals for each polarization that are then electrically filtered and digitized by four high-speed A/D converters.

The Generalized Homodyne Receiver can operate at a high speed and can be combined with multi-level PSK and 2-polarization transmission.

The Generalized Homodyne Receiver requires no front-end optical filter and provides the selectivity for optical frequency selection as well as shot-noise limited detection. It is stabilized for every hop at a rate of up to 1 kHz to cope with the key-based optical frequency hopping that causes mismatch the interferometric mixing process at the hybrid.

Prior art does not disclose an integrated single chip receiver that performs dual polarization differential detection of multi-level PSK modulated signal and pulsed optical local oscillator to sample both the I and Q photocurrents in each of the two polarizations There disclosed receiver helps to improve an optical link capacity with advanced transmission characteristics, reliability and compactness.

A compact single-chip integrated device has a number of advantages over multiple-chip or free space optics design.

Single-chip integration provides the highest performance characteristics, improved reliability and compactness.

It is virtually impossible to sequentially combine a splitter, modulators and polarization-converters in a single piece of electro-optical material, because of the limitation in commercially available wafers and manufacturing technology. Due to the high bending losses in many electro-optical materials, the direction of the waveguide propagation can not be steeply changed. In addition, in electro-optical materials, the desirable propagation direction has to be preserved in order to obtain smaller propagation losses and higher electro-optical effect.

In order to achieve the high level of integration within the same piece of electro-optical material, the mirror-like reflective regions are proposed for both Synthesizer and Analyzer integrated devices. Schematic diagrams for a novel quadrature transmitter and receiver are shown in FIG. 3 and FIG. 5, respectively, with the use of sets of light-reflective regions (39, 40 and 41,42) and (61,62 and 63, 64).

Such unique monolithic integration of complex functionality holds, in principle, an advantage in insertion losses, mechanical stability, ruggedness, size and manufacturing cost.

In the preferred embodiment, the device will be built on a 4" LN wafer using titanium in-diffused technology. The waveguides are designed for single-mode TE operation on X-cut, Y-propagation LN crystal. Y-junction reflectors and crossing waveguides are used to efficiently change the propagation direction in weakly-guided planar Ti-diffused LN structures. A combination of such techniques provides an effective and unprecedented integration capability. The innovative design of the Dual-Polarization Integrated LN Quadrature Transmitter Module that includes the above-mentioned components enables a significant reduction in the overall size of the chip, hence, assuring the 4" LN single die integration.

In the preferred embodiment, the chip substrate is coated with a buffer layer of silicon dioxide. A coplanar-waveguide (CPW) traveling-wave type electrode structure is formed on the buffer layer with thick plated-gold. $SiO_2$ and gold thickness are optimized for velocity matching of the optical and electrical signals. The CPWs are designed for 50 Ohms impedance. The QPSK modulator devices can be optimized for desired electro-optical bandwidth by modification of the buffer layer properties and electrode/waveguide geometry.

In the preferred embodiment, the velocity matching can be obtained by varying the following design parameters: the width of the center conductor, the gap between the center conductor and grounded electrodes, the thickness of the electrode structures and the buffer layers, as well as the dielectric properties of the buffer layer. The electro-optic bandwidth of a QPSK modulator primarily depends on the phase mismatch between the optical and microwave phase velocities. However, when they are matched and maximum optical bandwidth is achieved, the bandwidth value is limited by the total microwave loss.

In the preferred embodiment, the LN ferroelectric substrate can be used with its relative microwave region dielectric constant being significantly larger than that in the optical region. When velocity matching is achieved with certain parameters the characteristic impedance may be lower than 50 Ohms; this mismatch results in increased RF reflections degrading the electro-optical response, particularly at higher frequencies. Keeping the characteristic impedance near 50 Ohms may require adjusting the electrode structure in ways that result in less overlap between the RF field and the optical waveguide. Both of these issues will affect the switching voltage or $V_\pi$.

In the preferred embodiment, the attenuation of the RF signal is affected by several characteristics of the CPW waveguide. The amount of doping in the buffer influences the RF-attenuation due to varying resistivity and material losses. Larger center conductor widths and thicker electrodes reduce the RF propagation losses. Especially at thin Au thicknesses the electrical attenuation can increase dramatically. For example, the skin depth of Au is about 385 nm at 40 GHz. In the modified buffer structure the dielectric permittivity of the buffer layer can be increased, potentially improving the overlap of the RF field and the optical waveguide and enabling low-voltage and broadband-type performance. The buffer layer has a conductivity that is much lower than that of metals. Modifying the buffer layer by doping may result in a marked increase of the electrical field strength in the region of maximum optical field by increasing the electro-optical interaction. Thus, the doping of the buffer layer potentially allows for a reduction of microwave power consumption with respect to the conventional configuration of various electrode gap spacing (hot-to-ground).

A novel electro-optical Analyzer shown in FIG. 5 consists of the following integrated modules: i) Pulse carving MZ modulator for optical pulse forming of the CW local oscillator (LO) followed by Y-branch splitter/reflector; ii) Two balanced 90° coherent hybrids for dual polarization operation; iv) Four pairs of highly integrated balanced photoreceivers providing the real (I) and imaginary (Q) components for each channel (polarization) to be digitized.

In the preferred embodiment, similar to the Transmitter module, the phase resolving part of the Homodyne Receiver (90° optical hybrid) is based on titanium indiffused technology and Y-junction reflectors together with crossing waveguide elements. Use of these elements provides a unique form factor that allows a monolithically integrated LN die.

A pulse carving MZ modulator 51 is proposed as a pulse carver or shaper for the $L_o$. In the preferred embodiment, the design of the high frequency modulator is similar to one used for transmitter design. The single-polarization balanced 90° LN coherent hybrid is based on a single integrated balanced phase diversity receiver. Such receivers include four tunable 3 dB couplers for mixing the optical signals and two electro-optical phase-shifters for phase quadrature control.

In the preferred embodiment, the hybrid design is optimized for use with balanced photodetectors for coherent detection of PSK or QAM signals. The design includes the following features: Optical "I" (in-phase) and "Q" (quadrature) outputs; External DC biasing capability for optical amplitude and phase control; Local Oscillator (Lo) optical input for coherent mixing with Signal (S1/S2) on chip.

For each channel (polarization) the input signal is fed into corresponding input S1 or S2 and split by a tunable 3 dB coupler. The phase between the signals at the upper ports of each hybrid can be tuned by a phase-shifter. In each hybrid the $L_o$ is fed into corresponding input and split by a tunable 3 dB coupler. If the phase between the Lo and the Signals at the lower ports of each hybrid is adjusted to 90°, the combined signals at the device output ports will show the desired phase relation of the 90° hybrid: {180°, 90°, 270°} with respect to the first output.

Optoelectronic integrated circuits (OEICs) provide several advantages over their discrete and hybrid counterparts; among these are enhanced performance, ease of manufacture, and greater functionalities. Performance enhancement of OEIC receivers is provided by lower input capacitance and elimination of bond-wire inductance, which allows for higher operation speed and greater sensitivity. Manufacturing improvements accrue from the use of the photolithographically defined and monolithically produced combination of both detector and receiver, which eliminates labor-intensive packaging steps; at high speeds of 10 Gb/s and 40 Gb/s the benefits are even greater because of reduced packaging costs. Combination of greater functionality with the receiver element produces further gains. For example, photo detector (PD), transimpedance amplifier (TIA) and analog-to-digital converter (ADC) could be of considerable system advantage.

Such highly integrated Receiver Module will enable low manufacturing cost, mechanical stability, ruggedness, and high SNR in coherent optical system. The integration of various receiver components in a single LN chip dramatically reduces the cost, improves performance, and provides better stability and control to increase operational distance.

In various embodiments, the chip is a monolithic piece of a wafer that can be made of semiconductor or ferroelectric materials including but not limited to LiNbO3, and the like. In various embodiments, different effects relative to the output of the chip of the present invention are possible, including but not limited to, (i) thermo-optical, (ii) electro-optical, (iii) electro-absorption, and the like can be utilized with the Optical Device. The electro-optical material, which can be LiNbO3, can be cut at X, Y, or Z planes. The Optical Device of the present invention can utilize a variety of different processes in its creation, including but not limited to, metal indiffusion and/or (annealed) protonic-exchange technology, wet etching, reactive ion (beam) etching, plasma etching, and the like.

It is another object of the present invention to provide an optical communication system for data transmission using light of two polarization states, which implements disclosed synthesizer and analyzer. The block diagram of a coherent communications system according to the present invention is shown in FIG. 6(c). Optical transmitter 80 comprises a light source 81 and the synthesizer 30 that allows the data transmission in two polarization states of the light. Encoded optical signal is transmitted over the transmission link 82 to the optical receiver 83 where the data is decoded. The incoming beam is mixed in the analyzer 50 with the local oscillator beam from a local oscillator 84 and detected using a set of balanced photoreceivers. The output signals 75 carrying transmitted information can be displayed or used for further processing.

The application of the disclosed quadrature modulator is not limited to optical communications either free-space, fiber or waveguide. The present invention is related to any other possible applications of M-PSK modulation techniques.

The description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

What is claimed is:

1. A monolithically integrated optical synthesizer for a light beam transmitting, comprising: an optical pulse shaper receiving the light beam and outputting a shaped beam being split by a splitter into a first and a second transmitting beams, the optical shaper improving a transmitting beam waveform quality by switching the synthesizer output on and off; the first and the second transmitting beams entering a first M-PSK modulator and a second M-PSK modulator producing a first and a second modulated output beams; a first and a second polarization controllers receiving the first and the second output modulated beams, respectively, and creating a third and a fourth beams having polarization state orthogonal to each other; a combiner that combines the third and the fourth beams forming a final output beam, wherein the pulse shaper is turning the synthesizer off during a data drive signals transitions, and wherein the pulse shaper, the first and the second M-PSK modulators, the first and the second polarization controllers and the combiner are formed as a part of a single planar chip of an electro- optical material.

2. The optical device of claim 1, further comprising the first transmitting beam is reflected from a first and a second mirror prior to entering the first M-PSK modulator, and the second transmitting beam is reflected from a third and a fourth mirror prior to entering the second M-PSK modulator, wherein the first and the third mirrors located on the back output surface of the planar chip, and the second and the fourth mirrors located on the front surface of the planar chip, wherein the first, the second, the third and the fourth mirrors providing compactness critical to the synthesizer formation on the single chip.

3. The optical device of claim 1, wherein the chip is made of a material selected from ferroelectric or semiconductor material.

4. The optical device of claim 1, wherein the first M-PSK modulator includes a first and a second Mach-Zehnder modulator, and the second M-PSK modulator includes a third and a fourth Mach-Zehnder modulator, wherein the first M-PSK modulator further comprises a first phase shifter to provide an adjustable 90-degree phase difference between outputs from first and second Mach-Zehnder modulators, and the second M-PSK modulator further comprises a second phase shifter to provide an adjustable 90-degree phase difference between outputs from the third and the fourth Mach-Zehnder modulators.

5. The optical device of claim 4, wherein the first, the second, the third and the fourth Mach-Zehnder modulators are driven by independent separate RF signals.

6. The optical device of claim 4, wherein the waveguides of the first and second M-PSK modulators are coplanar to each other.

7. The optical device of claim 4, wherein the thermo optical control is used to control the phase in the first and second phase shifters.

8. The optical device of claim 1, wherein each of the first and second polarization controllers include polarization rotation and polarization phase shifting elements.

9. The optical device of claim 1, wherein the electro-optical material includes a substrate coated with a silicon dioxide buffer.

10. A monolithically integrated optical analyzer for receiving a transmitted optical beam, comprising: an optical pulse shaper receiving an incoming local oscillator beam, the shaper outputting an initial shaped beam being split by a splitter into a first and a second received beams, the optical pulse shaper serving as an optical sampler; the first received beam mixing with a first portion of the transmitted optical beam in a first 90° Optical Hybrid, both the first received beam and the first portion of the transmitted optical beam having a first polarization state; the second received beam mixing with a second portion of the transmitted optical beam in a second 90° Optical Hybrid, both the second received beam and the second portion of the transmitted optical beam having a second polarization state being orthogonal to the first polarization state; the first and the second 90° Optical Hybrids each outputting four hybrid output beams being detected by sets of four balanced detectors, outputting a series of electrical signals being used to recover transmitted data; wherein the pulse shaper, the first and the second 90° Optical Hybrid are formed as a part of a single planar chip wherein the first received beam being reflected from a first and a second mirror prior to entering the first 90° Optical Hybrid, and the second received beam being reflected from a third and a fourth mirror prior to entering the second 90° Optical Hybrid, the first and the third mirrors located on the back output surface of the planar chip, and the second and the fourth mirrors located on the front surface of the planar chip, and wherein the beams reflection providing compactness necessary to form the analyzer on a single chip.

11. The optical device of claim 10, wherein the chip is made of a material selected from ferroelectric or semiconductor or glass material.

12. An optical communication system for data transmission, comprising: a synthesizer transmitting an encoded optical beam to a receiver, the synthesizer comprising a first optical pulse shaper receiving the light beam, the first optical shaper outputting a shaped beam being split by a splitter into a first and a second transmitting beams, the optical shaper improving a transmitting beam waveform quality by switching the synthesizer output on and off; the first and the second transmitting beams entering a first M-PSK modulator and a second M-PSK modulator producing a first and a second modulated output beams; a first and a second polarization controllers receiving the first and the second output modulated beams, respectively, and creating a third and a fourth beams having polarization state orthogonal to each other; a combiner that combines the third and the fourth output beams forming a final output beam transmitted to the receiver, wherein the pulse shaper is turning the synthesizer off during a data drive signals transitions, and wherein the pulse shaper, the first and the second M-PSK modulators, the first and the second polarization controllers and the combiner are formed as a part of a single planar synthesizer chip.

13. The optical communication system of claim 12, wherein the receiver is a coherent optical receiver based on at least a first 90-degrees optical hybrid.

14. The optical communication system of claim 12, wherein the receiver having an analyzer comprising: a second optical pulse shaper receiving an incoming local oscillator beam, the shaper outputting an initial shaped beam being split by a splitter into a first and a second received beams, the optical pulse shaper that serves as an optical sampler; the first received beam mixing with a first portion of the transmitted optical beam in a first 90.degree. Optical Hybrid, both the first received beam and the first portion of the transmitted optical beam having a first polarization state; the second received beam mixing with a second portion of the transmitted optical beam in a second 90° Optical Hybrid, both the second received beam and the second portion of the transmitted optical beam having a second polarization state being orthogonal to the first polarization state; the first and the second 90° Optical Hybrids each outputting four hybrid output beams being detected by sets of four balanced detectors, outputting a series of electrical signals being used to recover transmitted data; and wherein the pulse shaper, the first and the second 90° Optical Hybrid are formed as a part of a single planar analyzer chip.

15. The optical communication system of claim 14, further comprising: the first transmitting beam is reflected from a first and a second mirrors prior to entering the first M-PSK modulator, and the second transmitting beam is reflected from a third and a fourth mirrors prior to entering the second M-PSK modulator, the first received beam being reflected from a fifth and a sixth mirrors prior to entering the first 90° Optical Hybrid, and the second received beam being reflected from a seventh and an eighth mirrors prior to entering the second 90° Optical Hybrid, the first and the third mirrors located on the back output surface of the planar synthesizer chip, and the second and the fourth mirrors located on the front surface of the planar synthesizer chip, wherein the first, the second, the third and the fourth mirrors providing compactness necessary to form the synthesizer on a single chip, and wherein the fifth and the seventh mirrors located on the back output surface of the planar analyzer chip, and the sixth and the eighth mirrors located on the front surface of the planar analyzer chip, wherein the fifth, the sixth, the seventh and the eighth mirrors providing compactness necessary to form the analyzer on the single chip.

16. The optical communication system of claim 12, wherein the data transmission is performed in fiber or in free space or between satellites.

17. The optical communication system of claim 12, wherein the data is transmitted using 16-QAM modulation format.

18. The optical communication system of claim 12, wherein the data is transmitted at a total bit rate of 100 Gbit/s.

* * * * *